June 18, 1929.　　　R. T. CALLOWAY　　　1,717,368
DISCONNECTING TYPE OF CABLE END BELL
Filed March 25, 1922　　　2 Sheets-Sheet 1
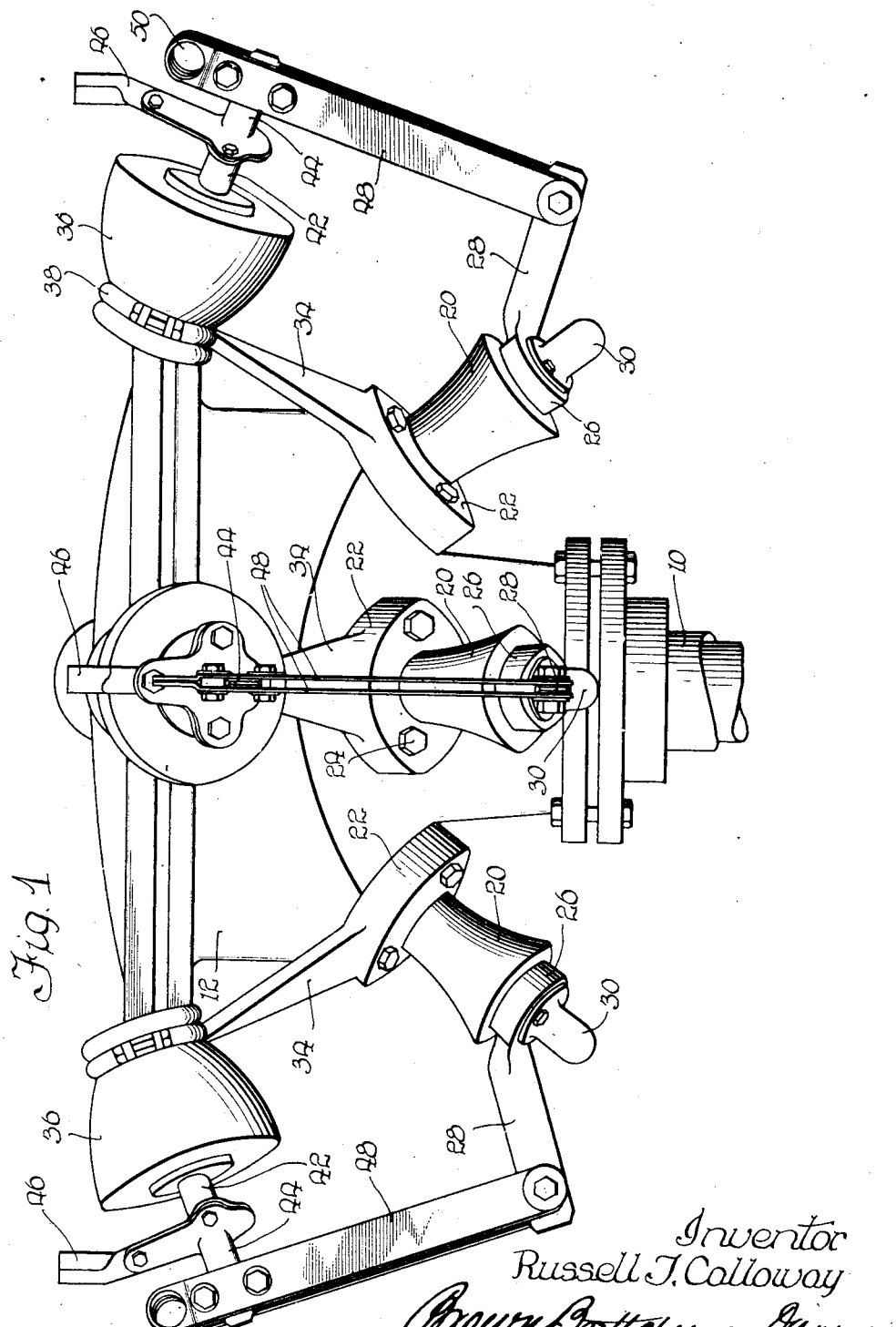
Inventor
Russell T. Calloway
By Brown Boettcher & Dienner
Att'ys

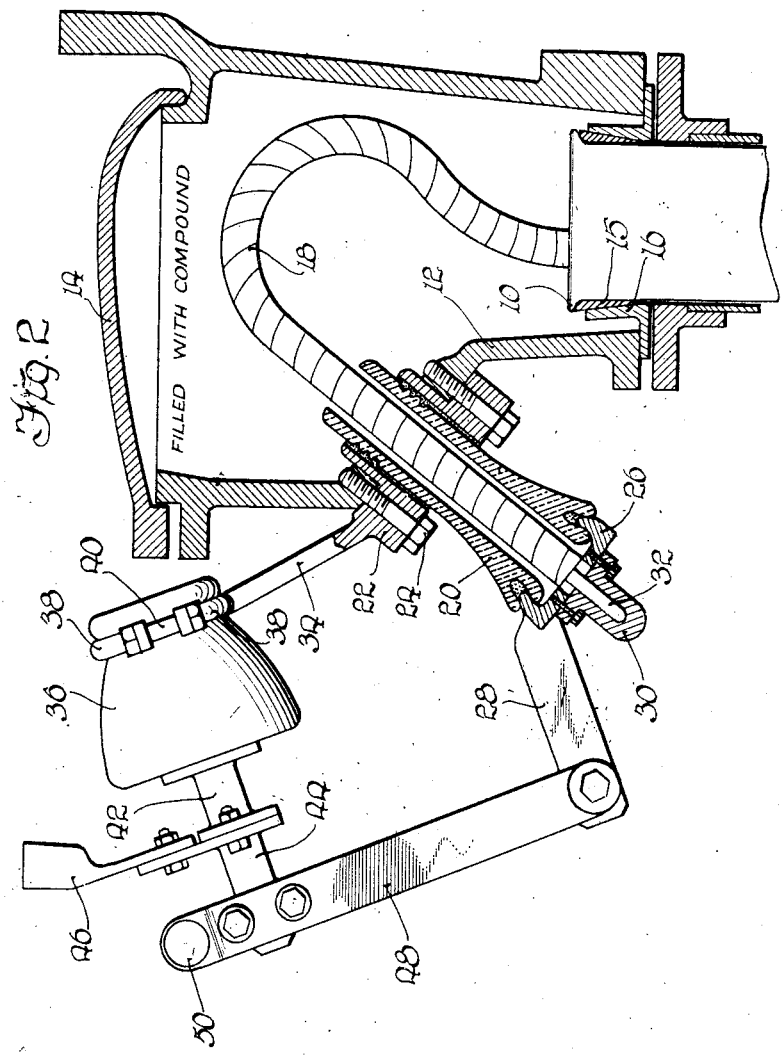

Patented June 18, 1929.

1,717,368

UNITED STATES PATENT OFFICE.

RUSSELL T. CALLOWAY, OF CHICAGO, ILLINOIS, ASSIGNOR TO ELECTRICAL ENGINEERS EQUIPMENT CO., OF CHICAGO, ILLINOIS, A CORPORATION OF ILLINOIS.

DISCONNECTING TYPE OF CABLE END BELL.

Application filed March 25, 1922. Serial No. 546,562.

My invention relates to electric wiring, and more specifically to means for connecting line wires for the transmission of power to cables extending underground into power houses and other similar connections.

One object of the invention is to increase the current carrying capacity and diminish the resistance of cable end bell connections.

Another object is to provide means at the cable end bell operable from a remote point for disconnecting the cable from overhead line wires, more particularly operable from below, rather than above the bell.

Another object is to provide a disconnecting switch mounted directly on a cable end bell.

Another object is to make the parts of such a switch as an assembled unit, independent of the bell, and attachable thereto as such.

Further objects and advantages of the invention will become apparent as the description proceeds.

In the accompanying drawings Figure 1 is a side elevation and Figure 2 a sectional view of a bell for three-phase connections, constructed according to the principles of my invention.

In the embodiment of the invention selected for illustration, a three-phase set of connections has been illustrated, but it will be obvious that the number of connections is immaterial.

The sheath 10 of the cable enters the bottom of the body 12 and is carefully belled out at its upper edge and anchored and grounded in any suitable or preferred manner. I have illustrated a taper ring 15 directly engaging the cable sheath and wedged inside a socket 16. The ring 15 is preferably split so that the wedging action can contract and force it into firm gripping engagement with the sheath 10.

The protection of the individual conductors 18, only one of which has been illustrated for purposes of clearness, is of primary importance. The body 12, therefore, when assembled with cover 14 and the fittings which conductors 18 leave the bell in place, forms a completely sealed enclosure, having no joint through which moisture could work into the interior. On this account, the apertures through which conductors 18 leave the body 12, open downwardly and outwardly through a downwardly and inwardly sloping wall. Tubular insulators 20, extending both inside and outside the body, encircle the extremities of conductors 18. Each insulator 20 is cemented into a support 22 suitably fastened in place on body 12 as by means of bolts 24.

At its outer end, insulator 20 carries an outlet bushing 26, also cemented in place and formed integral with the pivot finger 28 of an ordinary disconnecting switch. A cap 30 is suitably bolted on the outlet bushing 26 and sweated, hard soldered or otherwise suitably attached to the projecting metallic end 32 of conductor 18.

An arm 34 preferably but not necessarily integral with support 22 extends upwardly therefrom, being inclined outwardly at a slight angle to position the insulator 36 just clear of the upper portion of body 12. A suitable fitting comprising segmental clamping pieces 38 drawn together by bolts 40, is employed to fasten insulator 36 on the upper end of arm 34. While supports 22 and 34 have been illustrated as of one piece construction it will be obvious that each may be built up of several pieces if desired.

Insulator 36 is equipped with a post 42, to the base of which the base of the contact 44 of the switch is suitably attached. The terminal 46 is preferably fastened to the base of jaw 44, so that no current passes through the connection between the jaw 44 and the post 42.

The switch illustrated is of the floating blade type, comprising parallel spaced blades 48 adapted to straddle the pivot finger 28 and contact jaw 44, and terminating eyes 50, to permit operation of the switch by an ordinary switch hook.

If desired the cable may be grounded by the addition of a grounded contact like contact 44 upon the opposite side of the pivot contact 28. This renders the cable safe to work upon.

The installation of such a device is substantially as follows:

The cable is brought up through the neck of the bell and sheath 10 cut away and grounded and fastened in place as shown. The end of each cable 18 is thrust through its aperture, measured and cut off to the proper length. It is then sweated or otherwise attached to cap 30. It should be noted that insulators 20 and 36, and support 22 with its integral arm 34, constitute, with the disconnecting switch carried by the two insulators, a rigid unitary assembly which can be put together in the factory and sent out to the place of installation as a completed unit. This unit can be bolted in place, cable 18 can be protruded slightly through insulator 20 and outlet bushing 26 and sweated to cap 30, which is then bolted to bushing 26 to complete the assembly. Assembly of the disconnecting switch and its supporting means as an independent unit in the factory, makes it possible to obtain much better alignment and much more satisfactory operation of the parts of the switch, as well as diminishing the work done at the place of installation, which work is always more expensive and less reliable than shop work.

In the devices of the prior art, an ordinary plug and socket connection has been employed, which gives much less satisfactory contact than a regular disconnecting switch, especially after the parts have been separated and put together again a few times; and which is consequently of less current carrying capacity and more apt to heat. Furthermore, these connections were usually so placed that it was necessary for the workman to climb up above the bell to pull them apart, and in case an arc resulted from breaking the connection he would be close to it, and in such a position that it would be difficult or impossible for him to get away quickly. With devices according to my invention, these circuits can be interrupted with an ordinary switch hook on the end of a pole of suitable length, leaving the operator in perfect safety at all times.

Without further elaboration, the foregoing will so fully explain the gist of my invention, that others may, by applying current knowledge, readily adapt the same for use under various conditions of service without eliminating certain features which may properly be said to constitute the essential items of novelty involved, which items are intended to be defined and secured to me by the following claims.

I claim:

1. In a device of the class described, a disconnecting switch, insulators supporting the terminals of said switch, one of said insulators being tubular and open at both ends to receive a conductor for connection to one terminal of said switch, and means secured to said tubular insulator for mounting said switch on a cable end bell with said tubular insulator projecting inside said bell.

2. In a device of the class described, a base comprising an arm having insulator-holding means at both ends, one holding means being annular, a tubular insulator supported in said annular holding means, an insulator in the other holding means, a disconnecting switch mounted on said insulator, a cable end bell having an aperture positioned to receive one end of said tubular insulator, and means for fastening said annular means to said bell with said insulator projecting thru said aperture.

3. In a device of the class described, a cable end bell having an inwardly and downwardly sloping wall portion, a disconnecting switch, and insulators mounted on said bell and supporting the jaws of said switch, said insulators lying with their axes at an angle so that one of them can fit under said sloping wall portion.

4. In a device of the class described, a cable end bell having an inwardly and downwardly sloping wall portion, a disconnecting switch, and insulators mounted on said bell and supporting the jaws of said switch, said insulators lying with their axes at an angle so that one of them can fit under said sloping wall portion, being tubular to receive a conductor leading out of said bell.

5. In a device of the class described, a tubular insulator, a conductor passing therethrough, an outlet bushing on one end of said insulator, and a cap on said bushing, the extreme end of said conductor being fastened to said bushing, and said bushing having a central aperture to permit said conductor to enter said cap.

6. In a device of the class described, a tubular insulator, a conductor passing therethrough, an outlet bushing on one end of said insulator, the extreme end of said conductor being fastened into said cap, said cap being removably fastened to said bushing, said conductor being insulated except at its extreme end, and said bushing having an aperture large enough to permit passage of the insulated portion of said conductor.

7. The method of assembling a structure comprising a tubular outlet and a conductor passing therethrough with external connections for said conductor, which comprises protruding the conductor through the outlet, fastening a terminal connector on the extreme end of said conductor, and then fastening said terminal on the outer end of said outlet.

8. In a device of the class described, a cable end bell, an annulus carried by the bell, an insulator carried by the annulus and adapted for reception of the terminal portion of a cable conductor from within the bell, an arm projecting from the annulus, a second insulator on the arm, and a switch structure mounted on the insulators.

9. In combination, an insulator, an annulus supporting the same, an arm projecting from said annulus, a second insulator at the end of said arm, switch terminals on said insulators, and a cable connection leading through said annulus to the adjacent switch terminal.

10. In combination, a bell having a downwardly and outwardly opening orifice, an annulus fastened in said orifice, an insulator passing through said annulus, a second insulator supported by said bell and spaced from said first insulator, and current interrupting means supported by said insulators.

11. In combination, a bell having a downwardly and outwardly opening orifice, an annulus fastened in said orifice, an insulator passing through said annulus, a second insulator supported by said bell and spaced from said first insulator, and a disconnecting switch supported by said insulators.

12. In combination, a bell having a downwardly and outwardly opening orifice, an annulus fastened in said orifice, an insulator passing through said annulus, a second insulator supported by said bell and spaced from said first insulator, current interrupting means supported by said insulators, and a cable end passing axially through the annulus and its insulator for connection to said interrupting means.

13. In combination, an enclosure, a tubular insulator extending through a wall thereof, an insulated cable entering said insulator, an open cap on the end of said insulator permitting said cable to pass therethrough, the end of said cable being bared and of reduced diameter, a closed cap permanently united to said bared end, and current take off means associated with said open cap.

14. In combination, a tubular insulator, an insulated cable telescoped therein, a twopiece fitting comprising one piece attached to the insulator and another piece attached mechanically and electrically to the cable end, said pieces having shoulders to form a joint independent of their fastenings to the insulator and cable, and current take off means associated with the piece fastened to the insulator.

15. In combination, a casing, a tubular insulator leading out of said casing and cemented in place therein, a cable end leading out of said casing, a fitting cemented on said insulator, a fitting on the end of said cable, and fastening means forming a water tight joint between said fittings.

16. In combination, a casing, a tubular insulator leading out of said casing and cemented in place therein, a cable end leading out of said casing, a fitting cemented on said insulator, a fitting on the end of said cable, fastening means forming a metal-to-metal joint between said fittings, and a switch terminal carried by one of said fittings.

17. In combination, a casing, a tubular insulator leading out of said casing and cemented in place therein, a cable end leading out of said casing, a fitting cemented on said insulator, a fitting on the end of said cable, and fastening means forming a water tight joint between said fittings, the fitting on said insulator being shaped to permit the cable to be drawn out through it to fasten on the other fitting.

18. In combination, a bell, an insulator open at both ends and secured to said bell, a fitting secured to said insulator, a conductor leading out of said bell and through said insulator, means for fastening said conductor to said fitting, said means also closing one end of said insulator, a terminal member associated with said fitting and the fastening means, and means carried by the bell and coacting with the terminal member for closing and opening the conductor circuit.

19. In combination, a tubular insulator, an insulated cable telescoped therein, the end of said cable being bared, a two piece fitting comprising one piece attached to the insulator and another piece attached to the cable end, and means for fastening the two pieces together, said means being adapted to permit of the second piece of the fitting being attached to and detached from the first piece of the fitting while both pieces of the fitting are held against relative turning movement.

20. In combination, a bell, an insulator open at both ends and secured to said bell, a fitting secured to said insulator, said fitting being attachable to and removable from the insulator without access to the interior of the bell, a conductor leading out of the bell and through said insulator, means for fastening the conductor to the fitting and for closing one end of the insulator, and a terminal member carried by the fitting.

21. In combination, a bell, an insulator open at both ends and secured to said bell, a fitting secured to said insulator, a conductor leading out of the bell and through said insulator, means for detachably securing the conductor to the fitting and for closing one end of the insulator, a switch blade supporting arm carried by said fitting, and a switch blade mounted on said arm.

22. In a device of the class described, the combination of a casing adapted to receive the end of a cable having a plurality of conductors, means for preventing the access of moisture to the interior of said cable, insulators passing through said casing, said insulators enclosing the respective conductors of the cable in their outward passage from said casing, and disconnect switches mounted on the respective insulators and connected with the respective conductors of the cable.

23. In combination, an end bell, two insulators mounted on the outside of the bell, one of said insulators being hollow, a conductor extending outward from the end bell through the hollow insulator, and a disconnect switch mounted on said insulators, said conductor being connected to one terminal of the switch.

24. In combination, a hollow bell shaped body, two insulators mounted on the outside of the bell shaped portion of the body, a conductor extending outwardly from within the body, and a disconnect switch mounted on said insulators, said conductor being connected to one terminal of the switch.

In witness whereof, I hereunto subscribe my name this 18th day of March, 1922.

RUSSELL T. CALLOWAY.